US007809933B2

(12) United States Patent
Levitan et al.

(10) Patent No.: US 7,809,933 B2
(45) Date of Patent: Oct. 5, 2010

(54) SYSTEM AND METHOD FOR OPTIMIZING BRANCH LOGIC FOR HANDLING HARD TO PREDICT INDIRECT BRANCHES

(75) Inventors: David S. Levitan, Austin, TX (US); Wolfram Sauer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 11/759,350

(22) Filed: Jun. 7, 2007

(65) Prior Publication Data
US 2008/0307210 A1 Dec. 11, 2008

(51) Int. Cl.
G06F 7/38 (2006.01)
G06F 9/00 (2006.01)
G06F 9/44 (2006.01)
G06F 15/00 (2006.01)

(52) U.S. Cl. .................................................. 712/239
(58) Field of Classification Search .................. 712/239
See application file for complete search history.

(56) References Cited

U.S. PATENT DOCUMENTS 6,823,447 B2 * 11/2004 Hay et al. .................... 712/239

OTHER PUBLICATIONS

Aragon et al.; Power-Aware Control Speculation through Selective Throttling; 2003; ISHPCA '03.*
Black et al.; Perceptron-based Confidence Estimation for Value Prediction; 2004; IEEE.*
Tendler et al., "POWER4 System Microarchitecture", IBM Corporation, Technical White Paper, Oct. 2001, pp. 1-33.

* cited by examiner

Primary Examiner—Eddie P Chan
Assistant Examiner—Corey Faherty
(74) Attorney, Agent, or Firm—Stephen J. Walder, Jr.; Diana R. Gerhardt

(57) ABSTRACT

A system and method for optimizing the branch logic of a processor to improve handling of hard to predict indirect branches are provided. The system and method leverage the observation that there will generally be only one move to the count register (mtctr) instruction that will be executed while a branch on count register (bcctr) instruction has been fetched and not executed. With the mechanisms of the illustrative embodiments, fetch logic detects that it has encountered a bcctr instruction that is hard to predict and, in response to this detection, blocks the target fetch from entering the instruction buffer of the processor. At this point, the fetch logic has fetched all the instructions up to and including the bcctr instruction but no target instructions. When the next mtctr instruction is executed, the branch logic of the processor grabs the data and starts fetching using that target address. Since there are no other target instructions that were fetched, no flush is needed if that target address is the correct address, i.e. the branch prediction is correct.

20 Claims, 8 Drawing Sheets

| CYCLE: | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| LD | i0 | | | | | | d0 | | | | | | | | | d8 | | | | |
| MTCTR | i0 | | | | | | | d0 | | | | | | | | d3 | | | | |
| BCCTR | i0 | | | | | | | | | | | | | | | | | d5 | | |
| TARGET | | | | | | | | | | | | | | | | | | | | i0 |

*FIG. 3*

| CYCLE: | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| LD | i0 | | | | | | d0 | | | | | | | | | d8 | | | | |
| MTCTR | i0 | | | | | | | d0 | | | | | | | d7 | d3 | | | | |
| BCCTR | i0 | | | | | | | | | | | | | | | i0 | | d5 | | * |
| TARGET | | | | | | | | | | | | | | | | | | | | |

*FIG. 4*

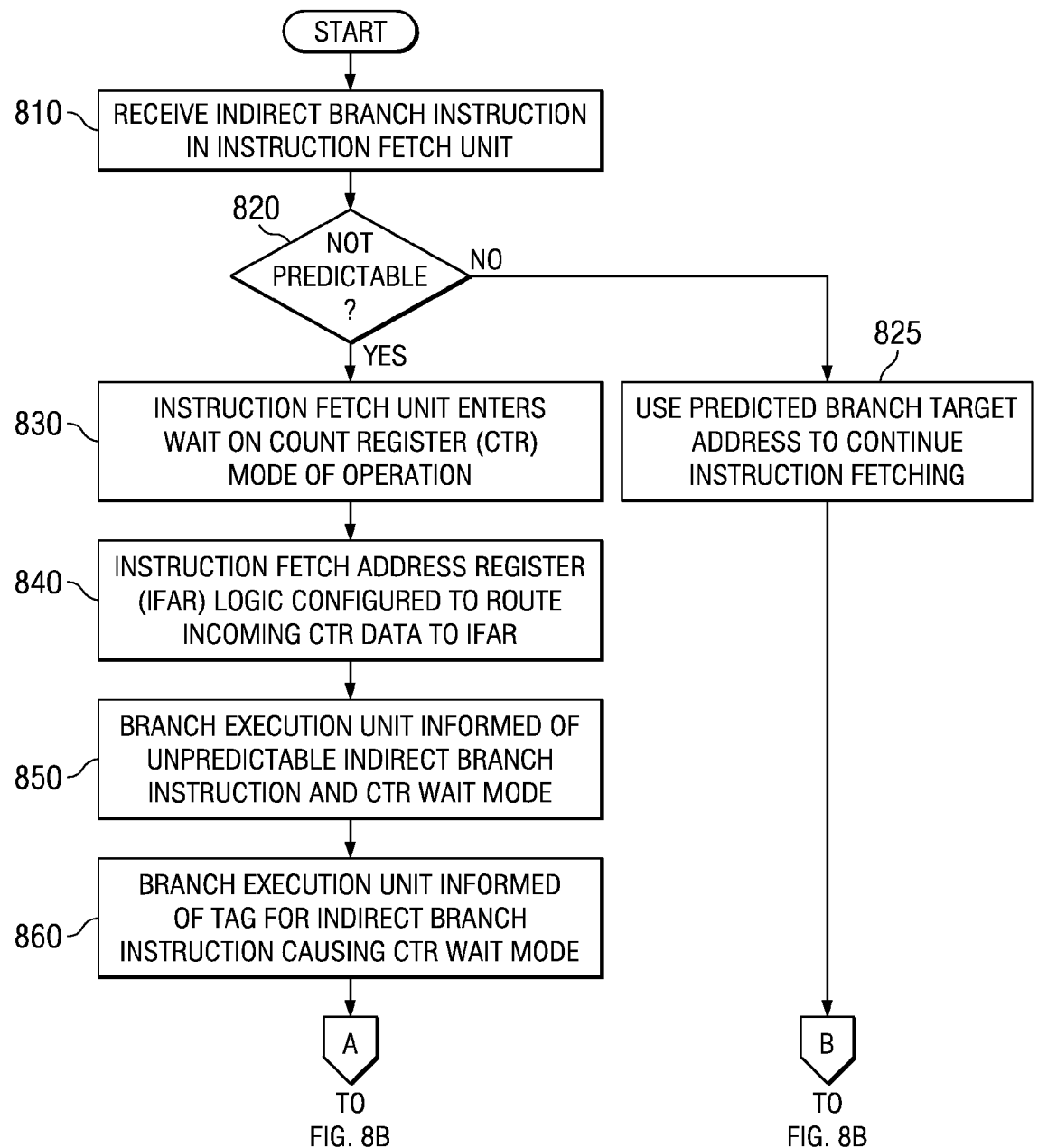

SYSTEM AND METHOD FOR OPTIMIZING BRANCH LOGIC FOR HANDLING HARD TO PREDICT INDIRECT BRANCHES

BACKGROUND

1. Technical Field

The present application relates generally to an improved data processing system and method. More specifically, the present application is directed to a system and method for optimizing the branch logic of a processor to improve handling of hard to predict indirect branches.

2. Description of Related Art

In modern superscalar processors, branch predictors are crucial to achieving high performance when executing program code. A branch predictor is a functional unit of a processor that determines whether a conditional branch in the instruction flow of a program is likely to be taken or not. Branch predictors allow processors to fetch and execute instructions without waiting for a branch to be resolved.

There are a number of different types of branch predictors utilized in various microprocessor designs. One such branch predictor is a branch target predictor. A branch target predictor is a functional unit of a processor that predicts the target of a conditional branch, or unconditional jump instruction, before that instruction has been fetched from the instruction cache. Branch target prediction is not the same as branch prediction. Branch prediction attempts to guess whether the branch will be taken or not. Branch target prediction attempts to guess the target of the branch or unconditional jump before it is computed from parsing the instruction itself. Essentially, the branch target predictor predicts the target of the branch given the address of the branch using a branch target address cache.

Many modern processors invest heavily in branch prediction mechanisms such as that discussed above to help mitigate the effects of long instruction execution pipelines which are needed by the high frequency designs of the processors. For example, in the PowerPC family of processors, available from International Business Machines Corporation of Armonk, N.Y., such as the Power4 processor, up to eight instructions may be fetched from the instruction cache with branch prediction logic scanning the fetched instructions looking for up to two branches for each processor cycle (see "Power4 System Microarchitecture," Tendler et al., Technical White Paper, October 2001, available at www.ibm.com). Depending upon the branch type found, various branch prediction mechanisms engage to help predict the branch direction or the target address of the branch, or both. Branch direction for unconditional branches is not predicted. All conditional branches are predicted, even if the condition register bits upon which they are dependent are known at instruction fetch time.

As branch instructions flow through the pipeline of the processor, and ultimately execute in the branch execution unit of the processor, the actual outcome of the branches is determined. At that point, if the predictions were found to be correct, the branch instructions are simply completed like all other instructions. In the event that a prediction is found to be incorrect, the instruction fetch logic of the processor causes the mispredicted instructions to be discarded and starts refetching instructions along the corrected path.

The Power4 processor uses a set of three branch history tables to predict the direction of branch instructions. The first table, referred to as the local predictor, is similar to a traditional branch history table (BHT). The local predictor is a 16K entry array indexed by the branch instruction address producing a 1-bit predictor that indicates whether the branch direction should be taken or not.

The second table, referred to as the global predictor, predicts the branch direction based on the actual path of execution to reach the branch. The path of execution is identified by an 11-bit vector, one bit per group of instructions fetched from the instruction cache for each of the previous eleven fetch groups. This vector is referred to as the global history vector. Each bit in the global history vector indicates whether the next group of instructions fetched are from a sequential cache sector or not. The global history vector captures this information for the actual path of execution through these sectors. That is, if there is a redirection of instruction fetching, some of the fetched group of instructions are discarded and the global history vector is immediately corrected. The global history vector is hashed, using a bitwise exclusive OR with the address of the branch instruction. The result indexes into a 16K entry global history table to produce another 1-bit branch direction predictor. Similar to the local predictor, this 1-bit global predictor indicates whether the branch should be predicted to be taken or not.

Finally, a third table, referred to as the selector table, keeps track of which of the two prediction schemes works better for a given branch and is used to select between the local and global predictions. The 16K entry selector table is indexed exactly the same way as the global history table to produce the 1-bit selector. This combination of branch prediction tables has been shown to produce very accurate predictions across a wide range of workload types.

As branch instructions are executed and resolved, the branch history tables and other predictors are updated to reflect the latest and most accurate information. Dynamic branch prediction can be overridden by software, such as in cases where software can predict better than the hardware which branches will be taken. Such overriding of the hardware may be accomplished by setting two bits in conditional branch instructions, one to indicate a software override and the other to predict the direction. When these two bits are zero, hardware branch prediction is utilized.

The Power4 processor microarchitecture supports a number of different types of branch instructions including the branch to link register (bclr) and branch to count register (bcctr) instructions. The bcctr instruction, for one, is an instruction for conditionally branching to an instruction specified by the branch target address contained within a count register of the processor. The count register is a special purpose register (SPR) of the processor that can be used to hold a loop count that can be decremented during execution of branch instructions and can also be used to provide a branch target address for the bcctr instructions. Branch target addresses for the bclr and bcctr instructions can be predicted using a hardware implemented link stack and count cache mechanism, respectively. Target addresses for absolute and relative branches are computed directly as part of a branch scan function.

As mentioned above, the Power4 processor uses a link stack to predict the target address for a branch to link instruction that it believes corresponds to a subroutine return. By setting hint bits in a branch to link register (bclr) instruction, software communicates to the processor whether a branch to link register (bclr) instruction represents a subroutine return, a target address that is likely to repeat, or neither.

When the instruction fetch logic of the processor fetches a bclr instruction (either conditional or unconditional) predicted as taken, it pushes the address of the next instruction onto the link stack. When it fetches a bclr instruction with a "taken" prediction and with hint bits indicating a subroutine return, the link stack is popped and instruction fetching starts from the popped address. In order to preserve integrity of the link stack in the face of mispredicted branch target link instructions, the Power4 processor employs extensive speculation tolerance mechanisms in its link stack implementation to allow recovering the link stack under most circumstances.

The target address of a branch to count register (bcctr) instruction is often repetitive. This is also true for some of the bclr instructions that are not predictable through the use of the link stack (because they do not correspond to a subroutine return). By setting the hint bits appropriately, software communicates to the hardware whether the target address for such branches are repetitive. In these cases, the Power4 processor uses a 32 entry, tagless, direct mapped cache, referred to as the count cache, to predict the repetitive targets, as indicated by the software hints. Each entry in the count cache can hold a 62-bit address. When a bclr or bcctr instruction is executed, for which the software indicates that the target is repetitive, and therefore predictable, the target address is written in the count cache. When such an instruction is fetched, the target address is predicted using the count cache. That is, the count cache stores the target address for previously encountered bcctr instructions so that if the same indirect branch instruction is encountered later, the prediction is that the indirect branch instruction will branch to the same target address.

In known PowerPC microarchitectures, the count cache is used as the sole mechanism to predict bcctr instructions. However, there are significant cases where the count cache based prediction does not generally result in a correct prediction. For example, with computed branches (function pointers), which are most frequently used in object oriented code, and case or switch statements, which use a branch table to jump to a desired code section, the count cache based prediction does not generally result in a correct prediction since such branches are hard to predict, i.e. the target address of such branches are not typically found in the count cache or the target address in the count cache is incorrect.

In addition, with known PowerPC microarchitectures, the processor design requires a "bubble" of a predetermined number of cycles, such as 4 cycle "bubble," between dispatching the move to count register (mtctr) instruction and its dependent bcctr instruction. That is, as mentioned above the count register stores the branch target address for the bcctr instructions. The target address must be loaded into the count register from the general purpose registers for use when executing the bcctr instruction. The mtctr instruction is used to move the branch target address from the general purpose register to the count register for use in executing the bcctr instruction. The 4 cycle "bubble" is used to ensure that the data representing the branch target address, that is moved by the mtctr instruction, is in the count register before the bcctr instruction executes. This requirement for a 4 cycle bubble between the mtctr instruction and the bcctr instruction causes additional execution latency.

SUMMARY

The illustrative embodiments provide a system and method for optimizing the branch logic of a processor to improve handling of hard to predict indirect branches. In particular, the illustrative embodiments provide logic for handling branch to count register (bcctr) instructions, which are indirect branch instructions, in a processor for performing branch target predictions. The illustrative embodiments leverage the observation that, at least for an in-order processor microarchitecture, there will generally be only one move to the count register (mtctr) instruction that will be executed while the bcctr instruction has been fetched and not executed. The bcctr instruction is the instruction for taking an indirect branch in the program instruction flow. The mtctr instruction is the instruction for moving a branch target address to an indirect target register, i.e. the count register.

With the mechanisms of the illustrative embodiments, fetch logic detects that it has encountered an indirect branch instruction, such as a bcctr instruction, that is hard to predict and, in response to this detection, blocks the target fetch from entering the instruction buffer of the processor. An indirect branch instruction is determined to be "hard to predict" if the branch target address is not in the count cache, i.e. there is a count cache miss, or if the branch target address is in the count cache but the entry in the count cache is indicated to be invalid or "hard to predict". At this point, the fetch logic has fetched all the instructions up to and including the bcctr instruction but no target instructions. When the next mtctr instruction is executed, the instruction fetch unit grabs the branch target address data from the special purpose register (SPR) bus as the data is being moved from the general purpose register (GPR) to the count register (CTR) and starts fetching using that branch target address. Since there are no other target instructions that were fetched, no flush is needed if that target address is the correct address, i.e. the branch target prediction is correct.

When the instruction fetch logic detects that it has encountered a hard to predict branch, as discussed above, it signals the branch execution unit that it has encountered a hard to predict bcctr instruction and indicates a branch tag. When the branch execution unit executes that branch, it checks to make sure that there was one and only one mtctr instruction that was executed after the hard to predict indirect branch instruction was fetched. If it is determined that there was no mtctr instruction executed, or more than one mtctr instruction executed, between the fetch of the bcctr instruction and the execution of the bcctr instruction, then the instructions following the branch need to be flushed from the pipeline. Alternatively, for out-of-order processors, a verification may be performed, such as with the use of a tag or other mechanism, to verify that the mtctr instruction that was used by the fetch logic was directed to the correct target address.

Essentially, the mechanisms of the illustrative embodiments use the mtctr instruction to move a target address to the count register for fetching the target instruction in parallel with the executing bcctr instruction. With the mechanisms of the illustrative embodiments, the 4 cycle bubble between the mtctr instruction and the bcctr instruction is still required. However, an additional benefit of the illustrative embodiments is that the performance of the processor can be improved by inserting instructions between the mtctr and the bcctr (e.g., by a compiler). The instruction fetch logic will be able to use the branch target address in the CTR earlier relative to the bcctr instruction dispatch.

In one illustrative embodiment, a method, which may be implemented in a processor of a data processing device, is provided. The method may comprise detecting a hard to predict indirect branch instruction being provided to an instruction fetch unit of the processor and placing the instruction fetch unit in a wait mode of operation, in response to detecting a hard to predict indirect branch instruction being provided to the instruction fetch unit. The wait mode is a mode of operation in which the instruction fetch unit waits for a branch target address to be provided, via a bus, to a count register used by the indirect branch instruction. The method may further comprise extracting the branch target address from the bus as the branch target address is being provided to the count register and placing the extracted branch target address in an instruction fetch address register. Moreover, the method may comprise exiting the wait mode of operation in response to the branch target address being placed in the instruction fetch address register and fetching instructions using the instruction fetch unit based on the branch target address in the instruction fetch address register.

The method may also comprise determining if the indirect branch instruction that caused the wait mode of operation in the instruction fetch unit is received in a branch execution unit for execution. A determination may be made as to whether only one count register update has been performed between detecting the indirect branch instruction being provided to the instruction fetch unit and the indirect branch instruction being received in the branch execution unit. Instruction fetching by the instruction fetch unit may be directed based on results of determining if only one count register update has been performed.

Directing instruction fetching by the instruction fetch unit based on results of determining if only one count register update has been performed may comprise flushing a pipeline of the processor if zero or more than one count register update has been performed between detecting the indirect branch instruction being provided to the instruction fetch unit and the indirect branch instruction being received in the branch execution unit. Placing the instruction fetch unit in a wait mode of operation may comprise providing a notification to a branch execution unit that a hard to predict indirect branch instruction is detected in the instruction fetch unit, providing an instruction tag to the branch execution unit, the instruction tag corresponding to the hard to predict indirect branch instruction, and storing the instruction tag in a register of the branch execution unit.

Determining if the indirect branch instruction that caused the wait mode of operation in the instruction fetch unit is received in a branch execution unit for execution may comprise comparing an instruction tag of an indirect branch instruction received in the branch execution unit to the instruction tag stored in the register of the branch execution unit. Moreover, determining if the indirect branch instruction that caused the wait mode of operation in the instruction fetch unit is received in the branch execution unit may comprise determining that the indirect branch instruction that caused the wait mode of operation in the instruction fetch unit has been received in the branch execution unit if the instruction tags match.

Detecting a hard to predict indirect branch instruction being provided to an instruction fetch unit of the processor may comprise checking a count cache to determine if a candidate branch target address for a received indirect branch instruction is present in the count cache. Detecting the hard to predict indirect branch instruction being provided to the instruction fetch unit may further comprise determining that the received indirect branch instruction is a hard to predict indirect branch instruction if no candidate branch target address is present in the count cache for the received indirect branch instruction.

Detecting a hard to predict indirect branch instruction being provided to an instruction fetch unit of the processor may comprise checking a count cache to determine if a candidate branch target address for a received indirect branch instruction is present in the count cache. In response to a candidate branch target address being present in the count cache for the received indirect branch instruction, it may be determined whether the candidate branch target address is marked as hard to predict. If a candidate branch target address is present in the count cache and the candidate branch target address is marked as hard to predict, it may be determined that the received indirect branch instruction is a hard to predict indirect branch instruction. The candidate branch target address may be marked as hard to predict if a predetermined number of uses of the candidate branch target address result in the candidate branch target address being incorrect in branch prediction.

The bus may be a special purpose register bus. The branch target address may be provided to the count register from a general purpose register via the special purpose register bus. The special purpose register bus may comprise signal lines for providing the branch target address to both the count register and instruction fetch address register logic of the instruction fetch unit.

In another illustrative embodiment, an apparatus is provided that includes an instruction fetch unit and a count register. The apparatus may further comprise a branch execution unit, a general purpose register, and a special purpose register bus. The instruction fetch unit and the branch execution unit may comprise logic that performs various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an exemplary pipeline sequence diagram of a known processor design with regard to a typical code sequence;

FIG. 4 is an exemplary pipeline sequence diagram of a processor, in accordance with one illustrative embodiment, with regard to the same typical code sequence;

FIGS. 8A-8B illustrate a flowchart outlining an exemplary operation for handling indirect branches of execution in accordance with one illustrative embodiment.

DETAILED DESCRIPTION OF THE ILLUSTRATIVE EMBODIMENTS

Figure 1:
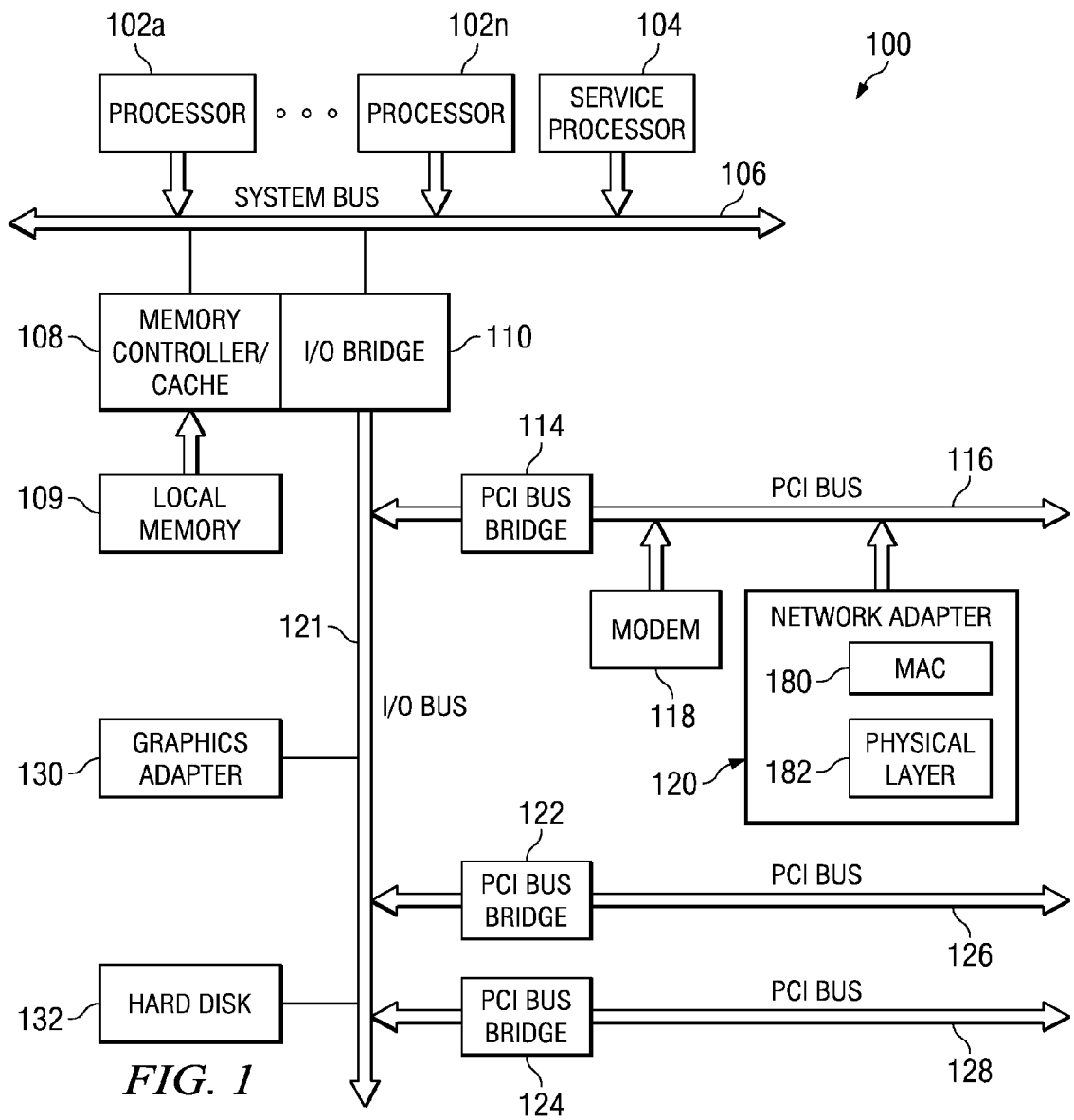
FIG. 1 is an exemplary diagram of a superscalar multiprocessor data processing system in which exemplary aspects of the illustrative embodiments may be implemented.
Figure 2A:
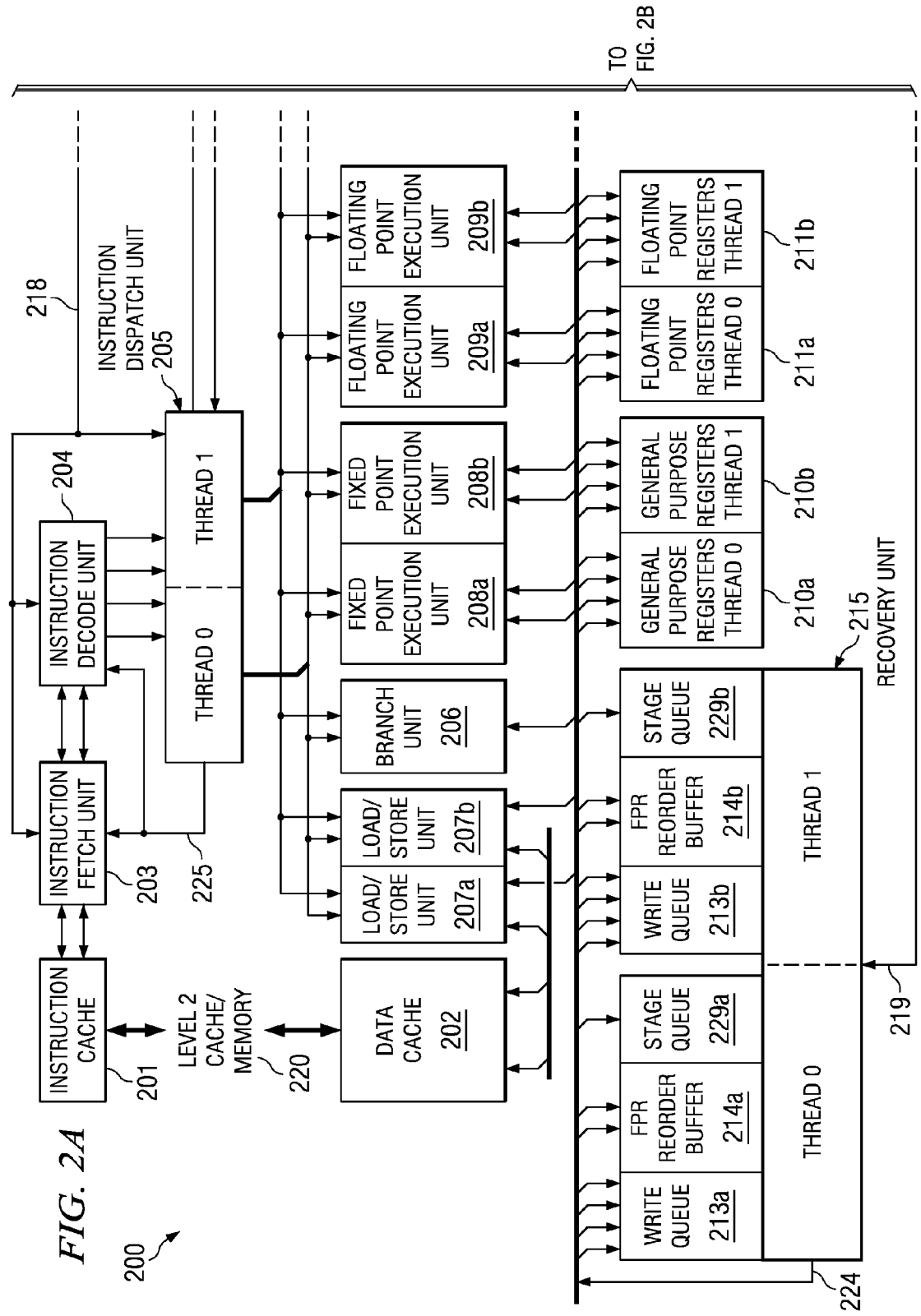
FIGS. 2A-2B are block diagrams of an exemplary processor architecture in which aspects of the illustrative embodiments may be implemented.
Figure 2B:
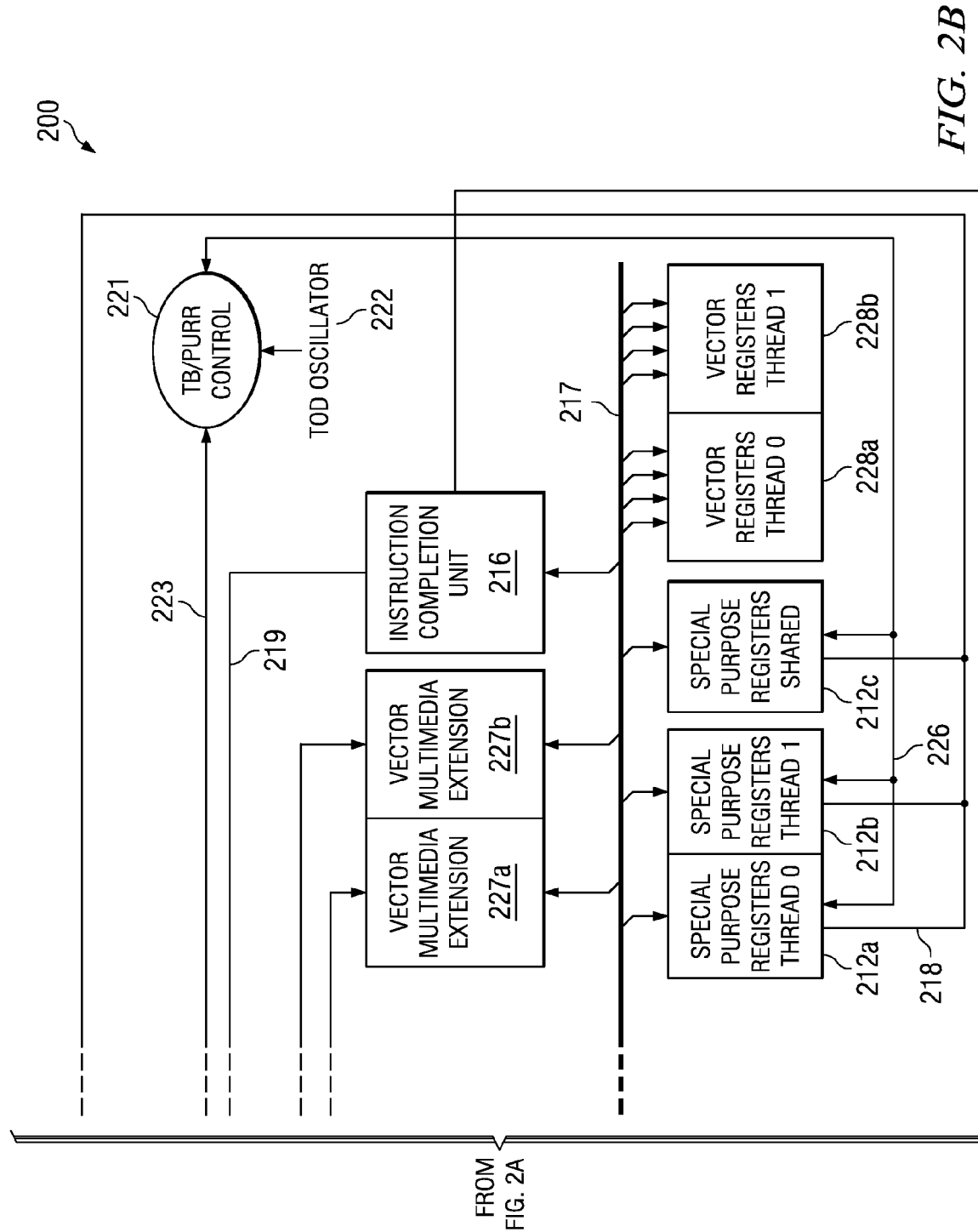

The illustrative embodiments provide a system and method for optimizing the branch logic of a processor with regard to handling hard to predict indirect branches. As such, the mechanisms of the illustrative embodiments may be utilized in any processor microarchitecture that utilizes branch prediction mechanisms for predicting target addresses of branches during execution of instructions via a pipeline. For purposes of this description, FIGS. 1 and 2A-2B are provided as examples of one type of data processing device and processor architecture in which exemplary aspects of the illustrative embodiments may be implemented. It should be appreciated that FIGS. 1 and 2A-2B are only exemplary and many modifications to the depicted examples may be made without departing from the spirit and scope of the present invention. FIGS. 1 and 2A-2B are not intended to state or imply any limitation with regard to the types of data processing devices and processor architectures with which the mechanisms of the illustrative embodiments may be used.

Referring to FIG. 1, an exemplary block diagram of a data processing system is depicted in accordance with one illustrative embodiment of the present invention. Data processing system 100 may be a symmetric multiprocessor (SMP) system including a plurality of SMT-capable processors 102a-102n connected to system bus 106. It should be appreciated that while a multiprocessor system is depicted for illustrative purposes, a single processor system may be employed without departing from the spirit and scope of the present invention.

All of the processors described herein with reference to all of the figures are superscalar, SMT-capable processors. Each superscalar, SMT-capable processor is capable of concurrently executing multiple threads on the one processor with varied amount of resources allocated to each thread. Further, each thread may have assigned to it a hardware priority that the processor may use when determining what and how many of the superscalar resources and processing cycles to grant to a particular thread.

As depicted, connected to system bus 106 is memory controller/cache 108 which provides an interface to local memory 109. I/O bus bridge 110 is connected to system bus 106 and provides an interface to I/O bus 121. Memory controller/cache 108 and I/O bus bridge 110 may be integrated as depicted or may be separate devices. System bus 106 can be connected to one or more like system busses which allows the data processing system to be incrementally scaled up to a large n-way SMP.

Peripheral component interconnect (PCI) bus bridge 114, connected to I/O bus 121, provides an interface to PCI local bus 116. A number of modems may be connected to PCI local bus 116 with FIG. 1 illustrating a single modem for simplicity. Typical PCI bus implementations will support four PCI expansion slots or add-in connectors. Communications links to network computers may be provided through modem 118 and/or network adapter 120 connected to PCI local bus 116 through add-in connectors.

Network adapter 120 includes a physical layer 182 which conditions analog signals to go out to the network, such as for example an Ethernet network over an R45 connector. A media access controller (MAC) 180 is included within network adapter 120. MAC 180 is coupled to bus 116 and processes digital network signals. MAC 180 serves as an interface between bus 116 and physical layer 182. MAC 180 performs a number of functions involved in the transmission and reception of data packets. For example, during the transmission of data, MAC 180 assembles the data to be transmitted into a packet with address and error detection fields. Conversely, during the reception of a packet, MAC 180 disassembles the packet and performs address checking and error detection. In addition, MAC 180 typically performs encoding/decoding of digital signals transmitted and performs preamble generation/removal as well as bit transmission/reception.

Additional PCI bus bridges 122 and 124 provide interfaces for additional PCI local buses 126 and 128, from which additional modems or network adapters may be supported. In this manner, data processing system 100 allows connections to multiple network computers. A memory-mapped graphics adapter 130 and hard disk 132 may also be connected to I/O bus 121 as depicted, either directly or indirectly.

Service processor 104 interrogates system processors, memory components, and I/O bridges to generate an inventory and topology understanding of data processing system 100. Service processor 104 also executes built-in-self-tests (BISTs), basic assurance tests (BATs), and memory tests on all elements found by interrogating a system processor, memory controller, and I/O bridge. Any error information for failures detected during the BISTs, BATs, and memory tests are gathered and reported by service processor 104.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to state or imply any architectural limitations with respect to the present invention.

Referring to FIGS. 2A-2B, an exemplary block diagram of a dual threaded processor design showing functional units and registers in accordance with one illustrative embodiment is shown. The processor is generally designated by reference number 200, and may be implemented as one of processors 102a-102n in FIG. 1, for example. Processor 200 comprises a single integrated circuit superscalar microprocessor with dual-thread SMT. Accordingly, as discussed further herein below, processor 200 includes various units, registers, buffers, memories, and other sections, all of which are formed by integrated circuitry. In one illustrative embodiment, processor 200 may operate according to Reduced Instruction Set Computer ("RISC") techniques.

As shown in FIGS. 2A-2B, instruction fetch unit (IFU) 203 is connected to instruction cache 201. Instruction cache 201 holds instructions for multiple programs (threads) to be executed. Instruction cache 201 also has an interface to level 2 (L2) cache/memory 220. Level 2 cache 220 (data cache 202) may also have associated with it a non-cacheable unit (not shown) which accepts data from the processor and writes it directly to memory 220, thus bypassing the coherency protocols required for storage to cache.

IFU 203 requests instructions from instruction cache 201 according to an instruction address, and passes instructions to instruction decode unit 204. In one illustrative embodiment, IFU 203 may request multiple instructions from instruction cache 201 for up to two threads at the same time. Instruction decode unit 204 decodes multiple instructions for up to two threads at the same time and passes decoded instructions to instruction dispatch unit (IDU) 205. IDU 205 selectively groups decoded instructions from instruction decode unit 204 for each thread, and outputs a group of instructions for each thread to execution circuitry 206, 207a, 207b, 208a, 208b, 209a, 209b, 227a and 227b of the processor.

In one illustrative embodiment, the execution circuitry of the processor 200 may include, for example, branch unit 206, fixed-point execution units (FXUA) 208a and (FXUB) 208b, load/store units (LSUA) 207a and (LSUB) 207b, floating-point execution units (FPUA) 209a and (FPUB) 209b, and vector multimedia extension units (VMXA) 227a and (VMXB) 227b. Execution units 206, 207a, 207b, 208a, 208b, 209a, 209b, 227a and 227b are fully shared across both threads. The processor includes multiple register sets 210a, 210b, 211a, 211b, 212a, 212b, 212c, 228a, and 228b separately for each of the two threads, namely general purpose registers (GPRs) 210a and 210b, floating-point registers (FPRs) 211a and 211b, special purpose registers (SPRs) 212a and 212b and vector registers (VRs) 228a and 228b. The processor additionally includes a set of SPRs 212c which is shared across both threads. Simplified internal bus structure 217 is shown to depict connections between execution units 206, 207a, 207b, 208a, 208b, 209a, 209b, 227a and 227b and register sets 210a, 210b, 211a, 211b, 212a, 212b, 212c, 228a, and 228b.

FPUA 209a and FPUB 209b input their register source operand information from, and output their destination register operand data to, FPRs 211a and 211b according to which thread each executing instruction belongs. FXUA 208a, FXUB 208b, LSUA 207a, and LSUB 207b input their register source operand information from, and output their destination register operand data to, GPRs 210a and 210b according to which thread each executing instruction belongs. A subset of instructions executed by FXUA 208a, FXUB 208b, and branch unit 206 use SPRs 212a, 212b and 212c as source and destination operand registers.

LSUA 207a and LSUB 207b input their storage operands from, and output their storage operands to, data cache 202 which stores operand data for multiple programs (threads). VMXA 227a and VMXB 227b input their register source operand information from, and output their destination register operand data to, VRs 228a and 228b according to which thread each executing instruction belongs. Data cache 202 also has an interface to level 2 cache/memory 220.

In response to the instructions input from instruction cache 201 and decoded by instruction decode unit 204, IDU 205 selectively dispatches the instructions to execution units 206, 207a, 207b, 208a, 208b, 209a, 209b, 227a and 227b. Execution units 206, 207a, 207b, 208a, 208b, 209a, 209b, 227a and 227b execute one or more instructions of a particular class of instructions. For example, FXUA 208a and FXUB 208b execute fixed-point mathematical operations on register source operands, such as addition, subtraction, ANDing, ORing and XORing. FPUA 209a and FPUB 209b execute floating-point mathematical operations on register source operands, such as floating-point multiplication and division. LSUA 207a and LSUB 207b execute load and store instructions which move operand data between data cache 202 and registers 210a, 210b, 211a, and 211b. VMXA 227a and VMXB 227b execute single instruction operations that include multiple data. Branch unit 206 executes branch instructions which conditionally alter the flow of execution through a program by modifying the instruction address used by IFU 203 to request instructions from instruction cache 201.

IDU 205 groups together decoded instructions to be executed at the same time, depending on the mix of decoded instructions and available execution units 206, 207a, 207b, 208a, 208b, 209a, 209b, 227a and 227b to perform the required operation for each instruction. For example, because there are only two load/store units 207a and 207b, a maximum of two load/store type instructions may be grouped together. In a preferred embodiment of the present invention, up to seven instructions may be grouped together (two fixed-point arithmetic, two load/store, two floating-point arithmetic or two vector multimedia extension, and one branch), and up to five instructions may belong to the same thread. IDU 205 includes in the group as many instructions as possible from the higher priority thread, up to five, before including instructions from the lower priority thread. However, either FPU instructions 209a and 209b or VMX instructions 227a and 227b are dispatched in the same group with fixed point instructions. FPU instructions 209a and 209b and VMX instructions 227a and 227b are never dispatched in the same group. Values in special purpose registers 212a and 212b indicate thread priority to IDU 205.

Instruction completion unit 216 monitors internal bus structure 217 to determine when instructions executing in execution units 206, 207a, 207b, 208a, 208b, 209a, 209b, 227a and 227b are finished writing their operand results. Instructions executed by branch unit 206, FXUA 208a, FXUB 208b, LSUA 207a, and LSUB 207b require the same number of cycles to execute, while instructions executed by FPUA 209a, FPUB 209b, VMXA 227a and VMXB 228b require a variable, and a larger number of cycles to execute. Therefore, instructions that are grouped together and start executing at the same time do not necessarily finish executing at the same time. When all the instructions grouped together within a thread are finished writing their operand results, the group is said to be "completed."

Instruction completion unit 216 monitors for the completion of instruction, and sends control information 219 to IDU 205 to identify that more groups of instructions can be dispatched to execution units 206, 207a, 207b, 208a, 208b, 209a, 209b, 227a and 227b. IDU 205 sends control information 225 to IFU 203 and instruction decode unit 204 to indicate that it is ready to receive more decoded instructions.

Processor 200 preferably also includes error detection circuitry (not shown on FIGS. 2A-2B) throughout all functional units, and recovery unit 215 which contains a backup copy of registers 210a, 210b, 211a, 211b, 212a, 212b, 212c, 228a, and 228b for both threads. Results written to register sets 210a, 210b, 211a, 211b, 212a, 212b, 212c, 228a, and 228b are also written to queue structures 213a, 213b, 214a, 214b, 229a, and 229b over internal bus structure 217. Register results from branch unit 206, FXUA 208a, FXUB 208b, LSUA 207a, and LSUB 207b are held in write queue 213a and 213b according to which thread the associated instruction belongs. Register results from VMXA 227a and VMXB 227b are held in stage queue 229a and 229b according to which thread the associated instruction belongs. Write queue 213a and 213b for each thread is a simple first-in-first-out (FIFO) queue structure. Because instructions executed by FPUA 209a and FPUB 209b require a variable, and a larger number of cycles to execute, and may complete out-of-order, these results are written to FPR reorder buffer 214a and 214b according to which thread the associated instruction belongs. FPR reorder buffer 214a and 214b arranges for each thread the results from FPUA 209a and FPUB 209b in the sequence which the associated instructions occurred in the program originally supplied by instruction cache 201.

The register results are held in write queue 213a and 213b, FPR reorder buffer 214a and 214b, and stage queue 229a and 229b for each thread until instruction completion unit 216 indicates (via control 219) that all instructions in the group have completed for each thread. If no errors are reported by the error detection circuitry (not shown in FIGS. 2A-2B), the results are drained from queue structures 213a, 213b, 214a, 214b, 229a, and 229b into the backup copy of the associated registers in recovery unit 215. In the event of an error, recovery unit 215 discards the contents of write queue 213a and 213b, FPR reorder buffer 214a and 214b, and stage queue 229a and 229b for each thread, and restores the backup copy of register sets 210a, 210b, 211a, 211b, 212a, 212b, 212c, 228a, and 228b using internal bus structure 217.

Processing may then be resumed from the known error-free instruction boundary. The process of copying, storing for a time and discarding such sets is known as checkpointing. There may be several such sets or backup copies stored in the recovery unit 215, and each set may be discarded on a FIFO basis, wherein each successive set represents the state of the registers after processing each group of instructions, wherein each set is known as a checkpoint.

Some of SPRs 212a, 212b, and 212c hold information used to control the operation of the various functional units. This is represented, simplified, in FIGS. 2A-2B by SPR bus 218. SPRs 212a and 212b have separate copies for each thread, while 212c is shared across all threads. Not limited to these examples, SPRs 212a, 212b, and 212c may include instruction addresses, thread priority control, condition code, save/restore addresses, machine state, etc.

Scattered among the units and registers of the processor core 200, are a number of circuits known as pervasive logic. Such circuits are driven by a system clock that may be turned off or blocked to all simultaneously. The circuits draw little power and consequently generate little heat while no clocking is provided to them. The circuits include functions such as overriding the normal operation of their host units and placing their respective hosts into a recovery mode.

As discussed above, in known processor microarchitectures, the branch logic, such as may be provided in the branch execution unit 206 uses a count cache to predict branch to count register (bcctr) instructions, but this does not work properly under certain cases as discussed above. There is no mechanism in the known architectures to utilize the actual count register (CTR) for directing instruction fetching for branch predictions. Moreover, known architectures require a bubble of cycles between dispatching an instruction for moving an indirect branch target address into the count register and dispatching an instruction for executing the indirect branch. These architectural limitations cause a degradation of performance by increasing execution latency for a typical code sequence.

The illustrative embodiments provide a system and method for optimizing the branch logic of a processor to improve handling of hard to predict indirect branches. In particular, the illustrative embodiments provide logic for handling branch to count register (bcctr) instructions in a processor for performing branch predictions. The illustrative embodiments leverage the observation that there will generally be only one move to the count register (mtctr) instruction that will be executed while the bcctr instruction has been fetched and not executed. The bcctr instruction is the instruction for taking an indirect branch in the program instruction flow. The mtctr instruction is the instruction for moving a branch target address to an indirect target register, i.e. the count register.

With the mechanisms of the illustrative embodiments, fetch logic detects that it has encountered an indirect branch instruction, such as a bcctr instruction, that is hard to predict and, in response to this detection, blocks the target fetch from entering the instruction buffer of the processor. An indirect branch is determined to be "hard to predict" if the branch target address is not in the count cache, i.e. there is a count cache miss, or if the branch target address is in the count cache but the entry in the count cache is indicated to be invalid or "hard to predict." At this point, the fetch logic has fetched all the instructions up to and including the bcctr instruction but no target instructions. When the next mtctr instruction is executed, the instruction fetch unit of the processor grabs the branch target address data from the special purpose register (SPR) bus as the data is being moved from the general purpose register (GPR) to the count register (CTR) and starts fetching using that branch target address. Since there are no other target instructions that were fetched, no flush is needed if that target address is the correct address, i.e. the branch prediction is correct.

When the instruction fetch logic detects that it has encountered a hard to predict branch, as discussed above, it signals the branch execution unit that it has encountered a hard to predict bcctr instruction and indicates a branch tag. When the branch execution unit executes that branch, it checks to make sure that there was only one mtctr instruction that was executed after the hard to predict indirect branch instruction was fetched. The branch execution unit further determines if the branch that was predicted to be "taken" was the correct branch, i.e. that the target address loaded into the count register by the mtctr instruction was correct. If it was not the correct branch target address, then the branch execution unit forces the branch to redirect to the correct target address, i.e. causes a flush of the pipeline and initiates fetching of instructions using the correct branch target address. If it is determined that there was no mtctr instruction executed, or more than one mtctr instruction executed, between the fetch of the bcctr instruction and the execution of the bcctr instruction, then the branch instructions need to be flushed from the pipeline. Alternatively, for out-of-order processors, a verification may be performed, such as with the use of a tag or other mechanism, to verify that the mtctr instruction that was used by the fetch logic was directed to the correct target address.

Essentially, the mechanisms of the illustrative embodiments use the mtctr instruction to move a target address to the count register for fetching the target instruction in parallel with the executing bcctr instruction. In order to provide such functionality, the special purpose register (SPR) bus of the processor is routed to the instruction fetch logic and multiplexed with other address sources to so that the branch target address may be received into a thread specific instruction fetch address register. Because of this, the branch target address data in the count register (CTR) may be delivered to the instruction fetch logic at least one cycle earlier than to the branch execution logic. This means that the target instruction may be fetched at least four cycles earlier than in known microarchitectures. Hence, the execution latency of bcctr instructions is reduced.

With the mechanisms of the illustrative embodiments, a bubble of a predetermined number of cycles, such as a 4 cycle bubble, between the mtctr instruction and the bcctr instruction is still required. However, an additional benefit of the illustrative embodiments is that the mtctr is pulled away from the bcctr by inserting instructions between them which further improves the performance of the processor because the instruction fetch logic will be able to use the branch target address in the CTR earlier relative to the bcctr instruction dispatch.

FIG. 3 is an exemplary pipeline sequence diagram of a known processor design with regard to a typical code sequence. The typical code sequence used to generate the pipeline sequence diagram in FIG. 3 is as follows:

| | | |
|---|---|---|
| ld | r3, disp(r1) | # load branch target address |
| mtctr | r3 | # move branch target to count register (CTR) |
| bcctr | | # branch |

As shown in FIG. 3, the load (ld), move to count register (mtctr), and branch to count register (bcctr) instructions may all be fetched in the same cycle, i.e. cycle 0. The load (ld) is dispatched first at cycle 6, then the dependent mtctr instruction at cycle 7, followed by the dependent bcctr instruction after 4 bubble cycles, i.e. at cycle 12. The cycle at which the count register (CTR) data arrives at the instruction fetch unit (IFU), e.g., instruction fetch unit 203 in FIGS. 2A-2B, is represented in FIG. 3 as d8 in cycle 15 (equal to d3 of the dependent bcctr instruction). Thus, the CTR data arrives at the IFU just in time for a d5 branch execution of the bcctr instruction. Finally, the branch target instruction is fetched 19 cycles after the bcctr instruction was fetched.

With the illustrative embodiments, the mtctr data, i.e. the new CTR value, is used to fetch the branch target instruction in parallel to executing the bcctr instruction. In order to achieve this, the SPR bus, e.g., SPR bus 218 in FIGS. 2A and 2B, may be routed to the instruction fetch logic of the instruction fetch unit (IFU) and multiplexed with other address sources to be input to a thread specific instruction fetch address register (IFAR). As a result, the branch target address that is being input to the count register is also, in parallel, provided to the instruction fetch address register for the thread which is then used to fetch the next instruction. Thus, the instruction fetch unit (IFU) does not have to wait for the indirect branch instruction, e.g., the bcctr instruction, to execute for the branch target instruction to be fetched. To the contrary, the branch target instruction is already fetched when the indirect branch instruction is executed. Thus, processor cycles may be saved by utilizing the mechanisms of the illustrative embodiments.

It should be noted, as mentioned above, that the mechanisms of the illustrative embodiments still utilize a bubble of a predetermined number of cycles, e.g., the 4 cycle bubble, between the mtctr instruction and the bcctr instruction. However, an additional benefit of the illustrative embodiments is that the mtctr may be pulled away from the bcctr by inserting instructions between them which further improves the performance of the processor because the instruction fetch logic will be able to use the branch target address in the CTR earlier relative to the bcctr instruction dispatch.

FIG. 4 is an exemplary pipeline sequence diagram of a processor, in accordance with one illustrative embodiment, with regard to the same typical code sequence. As shown in FIG. 4, as with FIG. 3, the load (ld), move to count register (mtctr), and branch to count register (bcctr) instructions may all be fetched in parallel at cycle 0. The load (ld) is dispatched first at cycle 6, then the dependent mtctr instruction at cycle 7, followed by the dependent bcctr instruction after 4 bubble cycles, i.e. at cycle 12. The cycle at which the count register (CTR) data arrives at the instruction fetch unit (IFU), e.g., instruction fetch unit 203 in FIGS. 2A-2B, is represented in FIG. 3 as d7 in cycle 14. This is one cycle earlier than the CTR data is provided to the branch execution logic at d8 in cycle 15 (equal to d3 of the dependent bcctr instruction). As a result, the branch target instruction can be fetched 15 cycles after the bcctr instruction is fetched rather than 19 cycles after the bcctr instruction as with the mechanism depicted in FIG. 3. This is an improvement of four cycles over the mechanism depicted in FIG. 3.

An additional benefit of the mechanisms of the illustrative embodiments is that the mtctr instruction may be pulled away from the bcctr instruction by the compiler inserting additional instructions between them in order to improve the performance of the processor pipeline. In such a case, the instruction fetch logic of the illustrative embodiments is able to use the CTR address even earlier relative to the bcctr instruction dispatch. Thus, by using the CTR address to identify and fetch a branch target instruction, rather than relying solely on the count cache, improved performance of the processor pipeline may be achieved for hard to predict indirect branches by reducing effective execution latency.

In order to achieve the benefits of the illustrative embodiments described above, the instruction fetch unit, instruction fetch unit dispatch control unit, and branch execution unit are provided with additional logic to implement the mechanisms of the illustrative embodiments. Moreover, signal lines are provided in the SPR bus to allow the CTR data to be received in the instruction fetch address register logic for use in fetching instructions. The various logic provided in these units operates in the following manner to achieve the purposes of the illustrative embodiments.

Figure 5:
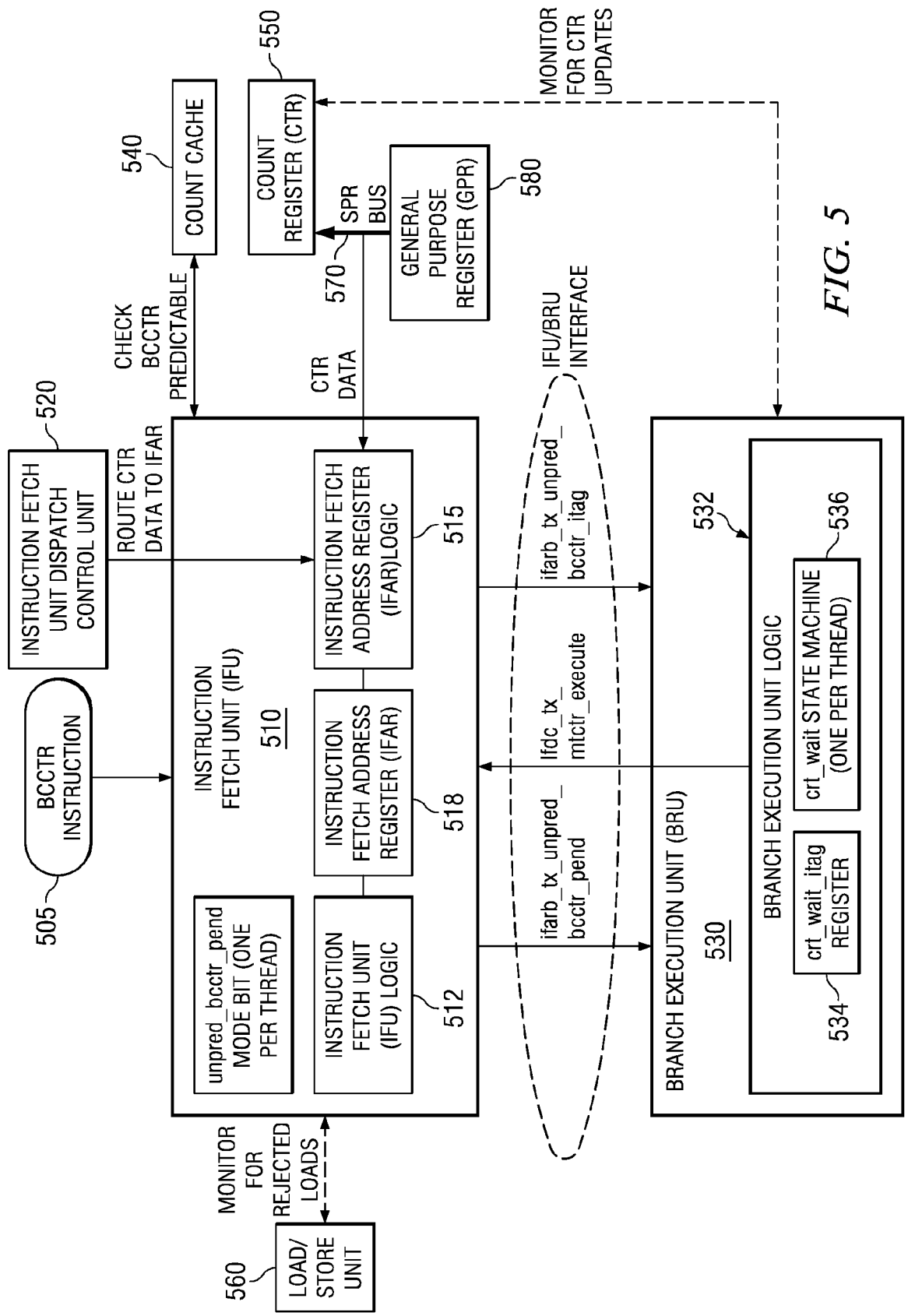
FIG. 5 is an exemplary block diagram illustrating the primary operational elements and an operation for handling a hard to predict branch to count register instruction in accordance with one illustrative embodiment.

FIG. 5 is an exemplary block diagram illustrating the primary operational elements and an operation for handling a hard to predict branch to count register instruction in accordance with one illustrative embodiment. As shown in FIG. 5, the primary operational elements for purposes of illustrating the operation of the illustrative embodiments include an instruction fetch unit (EFU) 510, instruction fetch address register (EFAR) logic 515, instruction fetch unit dispatch control unit 520, branch execution unit (BRU) 530, count cache 540, count register (CTR) 550, and SPR bus 570 for transferring branch target address data (CTR data) from a general purpose register (GPR) 580 to the CTR 550 and the IFAR logic 515. It will be appreciated that various connections between these units may be provided, such as by way of one or more buses, signal lines, or the like, to provide signal communication pathways between these elements to transfer the data and control information discussed hereafter. The elements shown in FIG. 5 may be part of a processor and thus, may be implemented in hardware, such as part of an integrated circuit device, package, or the like.

As shown in FIG. 5, the instruction fetch unit 510 first determines if it encounters a bcctr instruction 505 that is not predictable using the count cache 540. A bcctr instruction 505 is considered to be hard to predict, or "unpredictable," if it does not hit in the count cache 540, i.e. the indirect branch instruction went to that address last time the indirect branch instruction was executed, or if there is a hit in the count cache 540 but the entry is marked as invalid or unpredictable, as discussed in further detail hereafter. A count cache entry is marked unpredictable if the count cache target address does not match the actual correct bcctr target address for a predetermined number of consecutive uses, e.g., two consecutive uses, of a count cache entry. The count cache entry retains the unpredictable indication until it is replaced, or until a predetermined number of bcctr instructions have been executed that used unpredictable count cache entries.

If the bcctr instruction 505 is determined to be unpredictable, the instruction fetch unit 510 waits for the count register (CTR) 550 data to arrive, i.e. the instruction fetch unit 510 enters a count register wait (CTR_wait) mode of operation. The instruction fetch unit maintains a new mode bit referred to as the unpred_bcctr_pending mode bit which is set when the instruction fetch unit encounters an unpredictable bcctr instruction. When this upred_bcctr_pending mode bit is set, the instruction fetch unit stops fetching instructions and the instruction fetch unit logic 512 waits for the CTR data to arrive from the GPR 580 via a mtctr instruction. As shown in FIG. 5, the mtctr instruction causes the CTR data, i.e. the branch target address data, to be moved from the GPR 580 to the CTR 550 and, via the additional SPR bus 570 signal lines of the illustrative embodiments, directly into the IFAR logic 515 which is instructed, by the IFU dispatch control unit 520, to insert the CTR data into the IFAR 518 for the thread.

The instruction fetch unit 510 resets this unpred_bcctr_pending mode bit when the instruction fetch unit 510 exits the CTR_wait mode, such as when a redirect occurs or when the CTR data is received on the special purpose register (SPR)

bus 570, e.g., bus 218 in FIGS. 2A and 2B. When the CTR_wait mode is exited, the instruction fetch unit 510 resumes fetching instructions starting with the address specified by the received CTR data. There is one unpred_bcctr_pending bit per thread in the processor. The threads enter and exit the CTR_wait mode, and thus set and reset the unpred_bcctr_pending mode bit independently of each other.

The instruction fetch unit dispatch control (IFDC) unit 520 sends a signal to the IFAR logic 515 indicating that a mtctr instruction has been dispatched. This enables the IFAR logic 515 to route the incoming CTR data into the instruction fetch address register 518.

In order to be able to steer the incoming CTR data from the SPR bus 570 to the instruction fetch address register 518, the branch execution unit logic 532 of the branch execution unit 530 sends an indication signal to the instruction fetch unit 510 two cycles before the data arrives, i.e. ifdc_tx_mtctr_execute is received into a d5 latch and mtctr data is received into a d7 latch. The instruction fetch unit 510 also monitors the load/store unit 560, such as load/store unit 207a and/or 207b in FIGS. 2A and 2B, for rejections and blocks the mtctr data from being accepted into the instruction fetch address register 518 for 8 cycles after the rejection is detected from the load/store unit. This avoids invalid CTR data being used for the branch target instruction based on a rejected load.

The instruction fetch unit (IFU) logic 512 of the instruction fetch unit 510 sends a signal to the branch execution logic of the branch execution unit 530 indicating that it has seen an unpredictable bcctr instruction and is waiting for the mtctr instruction's data, i.e. the CTR data, to arrive. The instruction fetch unit logic 512 of the instruction fetch unit 510 further sends an instruction tag (itag) of the bcctr instruction that caused the instruction fetch unit 510 to enter the CTR_wait mode. The branch execution unit 530 comprises branch execution unit logic 532 that includes a crt wait state machine 536, as will be described in greater detail hereafter, for each thread to monitor the transition of states while the instruction fetch unit 510 is operating in the CRT_wait mode. The instruction fetch unit 510 leaves the CTR_wait mode on any type of redirect or after the mtctr instruction's data has been used to fetch the branch target instruction.

New signals ifarb_tx_unpred_bcctr_pend and ifarb_tx_unpred_bcctr_itag are used to indicate to the branch execution unit 530 when the instruction fetch unit 510 enters and exits the CTR_wait mode, i.e. when unpred_bcctr_pending mode bit is set and reset, and what instruction (itag) triggered the entry. The ifarb_tx_unpred_bcctr_pend signal is asserted when the instruction fetch unit 510 enters the CTR_wait mode and is de-asserted when the instruction fetch unit 510 exits the CTR_wait mode.

The branch execution unit logic 532 monitors all CTR updates once it sees that the instruction fetch unit has entered the CTR_wait mode, by setting the unpred_bcctr_pending mode bit and asserting the ifarb_tx_unpred_bcctr_pend signal, until the bcctr instruction that triggered the CTR_wait mode executes, as may be determined by an itag comparison. In order to monitor the CTR updates, the branch execution unit logic 532 latches the itag along with a valid bit. The valid bit is set and the itag, i.e. the ctr_wait_itag 534, is copied into a local latch of the branch execution unit logic 532 when the ifarb_tx_unpred_bcctr_pend signal is asserted and the itag valid bit is not currently set. A redirect in the same cycle will prohibit the valid bit from being set. Once the valid bit has been set, it can only be reset by either a redirect occurring (branch or completion) or the bcctr instruction matching the ctr_wait_itag being dispatched to the instruction fetch unit 510.

When the bcctr instruction, that is the cause of the CTR_wait mode as determined by a comparison of the itag stored in the branch execution unit logic 532 with the itag of the bcctr instruction, is dispatched to the branch execution unit 530, the branch execution unit logic 532 of the branch execution unit 530 determines, based on the CTR_wait indication and the stored bcctr instruction tag (itag), whether the bcctr instruction needs to redirect or not. In other words, the branch execution unit logic 532 determines if the branch target address stored in the instruction fetch address register 518 is the correct branch target address or if a flush of the younger instructions in the pipeline is required with the fetching of instructions restarted at the correct branch target address. This decision involves discerning between three possible cases.

The first case is that there is no mtctr instruction data returned and that the instruction fetch unit 510 is still indicating that it is in the CTR_wait mode. In this first case, the bcctr instruction needs to redirect in order to wake up the instruction fetch unit 510, i.e. transition it from the CTR_wait mode. The branch execution unit 530 forces the bcctr instruction to redirect to achieve the waking up of the instruction fetch unit 510. The redirect causes the instruction fetch unit to exit the CTR_wait mode by resetting the unpred bcctr_pending mode bit.

In a second case, i.e. the case that is targeted by the mechanisms of the illustrative embodiments, there is only one mtctr instruction and no further CTR updates either by mtctr instructions or bcctr instructions. In this second case, the instruction fetch unit 510 used the correct CTR data value to obtain the branch target instruction and the bcctr instruction will not redirect.

In a third case, there is a mtctr instruction dispatched and another CTR update, either by a mtctr instruction or bcctr instruction, following it. In this third case, the instruction fetch unit 510 did not use the correct CTR data value to obtain the branch target instruction. As a result, the bcctr instruction needs to redirect.

Thus, with the mechanisms of the illustrative embodiments, the branch target address may be fetched into the instruction fetch address register 518 directly from the SPR bus 570 and the instruction fetch unit 510 may start fetching the branch target instruction based on this address prior to the indirect branch instruction, e.g., the bcctr instruction, executing. That is, the availability of the branch target address to the instruction fetch unit 510 is keyed to the mtctr instruction and is not dependent on the bcctr instruction. This saves processor cycles in performing indirect branch prediction and execution. Hence, the mtctr instruction may be separated from the bcctr instruction, where in known microarchitectures such a separation is not possible. Additional instructions may be inserted into this area of separation and thereby increase the performance of the processor pipeline.

It should be appreciated that the communication interface between the instruction fetch unit 510 and the branch execution unit 530 may experience a delay, e.g., there may be a unit latch in both directions on the interface. As a result, the instruction fetch unit 510 may see a mtctr instruction execute after it saw an unpredictable bcctr instruction being fetched, but the branch execution unit 530 may see the mtctr instruction execute first. In order not to get out of synchronization, the branch execution unit 530 may keep track of mtctr instruction execute events even if there is no unpredictable bcctr instruction yet indicated to it by the instruction fetch unit 510. The instruction fetch unit 510 is not able to accept a mtctr instruction execute in the cycle immediately following an unpredictable bcctr instruction being detected due to timing requirements. Therefore, the last cycle of an executing mtctr instruction, which was accepted by the instruction fetch unit, in which an unpredictable bcctr instruction can be indicated, is d7 cycle of the mtctr instruction.

Figure 6:
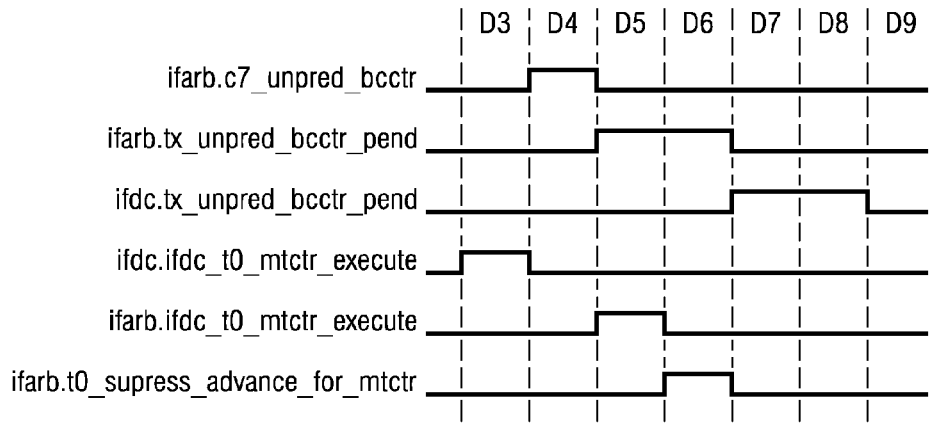
FIG. 6 is a timing diagram illustrating relative timings of interface signals for an interface between the instruction fetch unit and the branch execution unit in accordance with one illustrative embodiment.

FIG. 6 is a timing diagram illustrating relative timings of interface signals for an interface between the instruction fetch unit and the branch execution unit in accordance with one illustrative embodiment. In the timing diagram of FIG. 6, the labels along the x-axis are relative to the mtctr instruction execution. The latest that an unpredictable bcctr instruction can be detected and still accept the mtctr is cycle d4. The instruction fetch unit 510 accepts the mtctr instruction execute signal the next cycle and asserts the tx_unpred_bcctr_pend signal at the same time. That signal will be received in the branch execution unit 530 (referred to in FIG. 6 as ifdc) in cycle d7. Thus, the branch execution unit 530 (ifdc) needs to remember the mtctr instruction for four cycles to determine whether the instruction fetch unit 510 (ifarb in FIG. 6) accepted it for executing the bcctr instruction.

Thus, from FIG. 6 it can be seen that if the mtctr instruction is dispatched and executed too early, then the branch execution unit logic will not be able to use it since the mtctr would complete before the bcctr instruction is fetched. This in effect limits the number of instructions that may be inserted between the mtctr instruction and the bcctr instruction. That is, care must be taken that the mtctr instruction is not separated from the bcctr instruction by too many instructions such that the CTR data returned by the mtctr instruction is unusable by the bcctr instruction.

Figure 7:
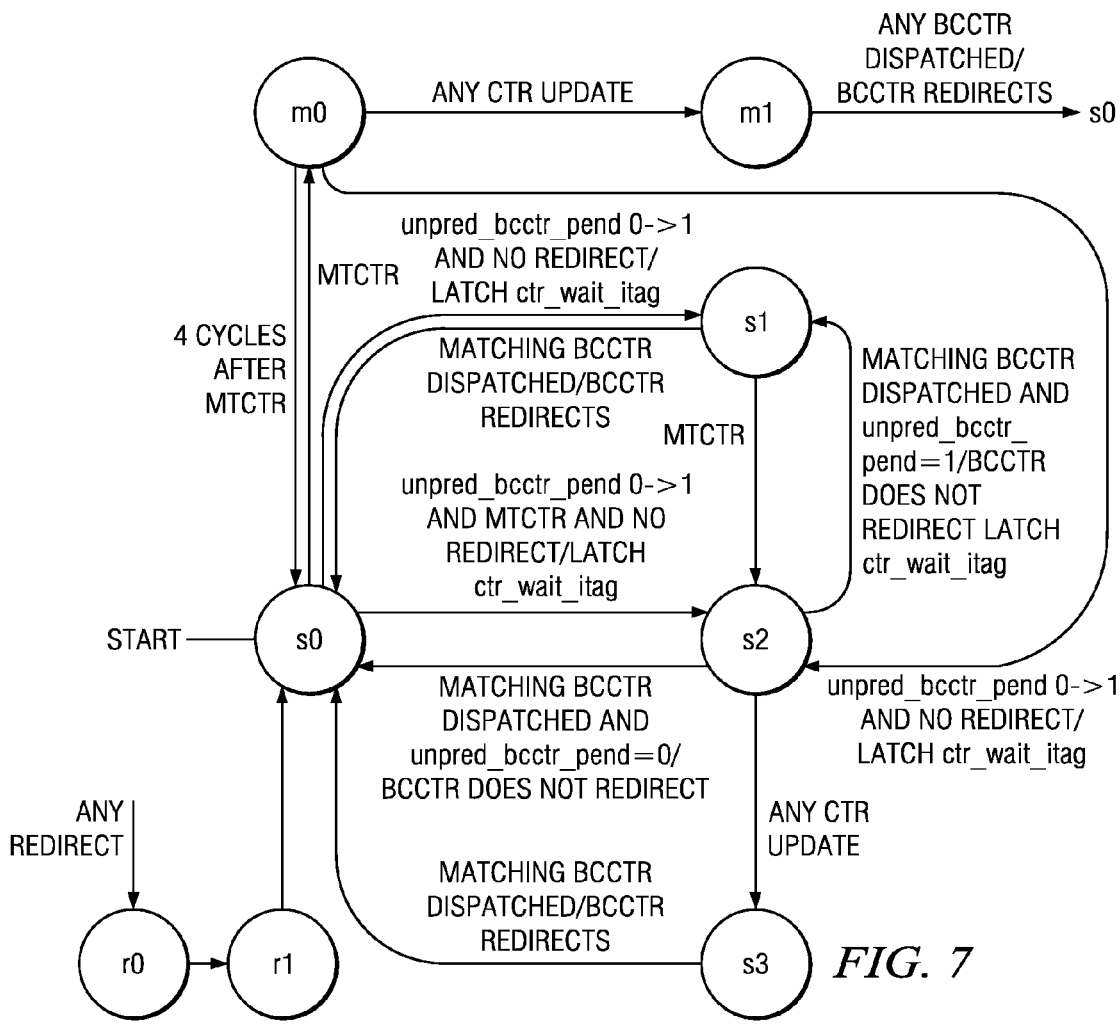
FIG. 7 is an exemplary diagram of a state machine of a branch execution unit for monitoring the state of a CTR_wait mode in accordance with one illustrative embodiment.

FIG. 7 is an exemplary diagram of a state machine of a branch execution unit for monitoring the state of a CTR_wait mode in accordance with one illustrative embodiment. The branch execution unit, e.g., branch execution unit 530 in FIG. 5, maintains a state machine such as that depicted in FIG. 7, for each thread to keep track of the current status of the CTR_wait mode of the instruction fetch unit, e.g., instruction fetch unit 510 in FIG. 5. It should be appreciated that while the illustrative embodiments described herein implement the state machine of FIG. 7 in hardware, in other illustrative embodiments, the state machine of FIG. 7 may be implemented in software or a combination of hardware and software without departing from the spirit and scope of the present invention.

As shown in FIG. 7, with regard to the mtctr instruction, the state machine starts with an initial state S0 and transitions to state M0 when a mtctr instruction is dispatched. The state machine transitions back to state S0 four cycles after the mtctr instruction is dispatched. Alternatively, if the instruction fetch unit enters the CTR_wait state, i.e. by asserting the unpred_bcctr_pend signal with no redirect indicated in the same cycle, the state machine transitions to state S2, discussed hereafter, with the itag of the bcctr instruction causing the entry into the CTR_wait state being latched into the branch execution unit logic. Moreover, if there is a CTR update, the state machine transitions to state M1. In state M1, the state machine transitions back to state S0 in response to any bcctr instruction being dispatched and/or a bcctr instruction redirect.

With regard to the bcctr instruction, the state machine starts with an initial state S0 and transitions to state S1 in response to the unpred_bcctr_pend signal being asserted, i.e. going from a logic low (0) state to a logic high (1) state, with no redirect being indicated in the same cycle. The ctr_wait_itag, i.e. the itag of the bcctr instruction causing the CTR_wait mode of operation is latched into the branch execution unit logic. Alternatively, if the unpred_bcctr_pend signal is asserted and there is a mtctr instruction dispatched with no redirect, then the itag of the bcctr instruction is latched into the branch execution unit logic and the state machine transitions to state S2.

At state S1, if a matching bcctr instruction is dispatched or the bcctr instruction is redirected, the state machine transitions back to state S0. Otherwise, if a mtctr instruction is dispatched, the state machine transitions to state S2. In state S2, if a matching bcctr instruction is dispatched, i.e. the itag of the bcctr instruction matches the itag latched into the branch execution unit logic, and the unpred_bcctr_pend signal is being asserted, i.e. has a logic high (1) state, then the bcctr instruction is not redirected and the ctr_wait_itag is latched into the branch execution unit logic with the state machine transitioning back to state S1. If a matching bcctr instruction is dispatched and the unpred_bcctr_pend signal is de-asserted, i.e. has a logic low (0) state, then the bcctr instruction is not redirected and the state machine transitions to state S0.

From state S2 if there is any CTR update, the state machine transitions to state S3. In state S3, if there is a matching bcctr instruction dispatched, the bcctr instruction is redirected and the state machine transitions back to state S0.

States R0 and R1 are provided in the state machine to ensure unpredictable bcctr instructions which are discovered before the redirect are treated appropriately. These bcctr instructions that are discovered before the redirect do not cause a state change from S0 to S1 or S2.

Figure 8B:
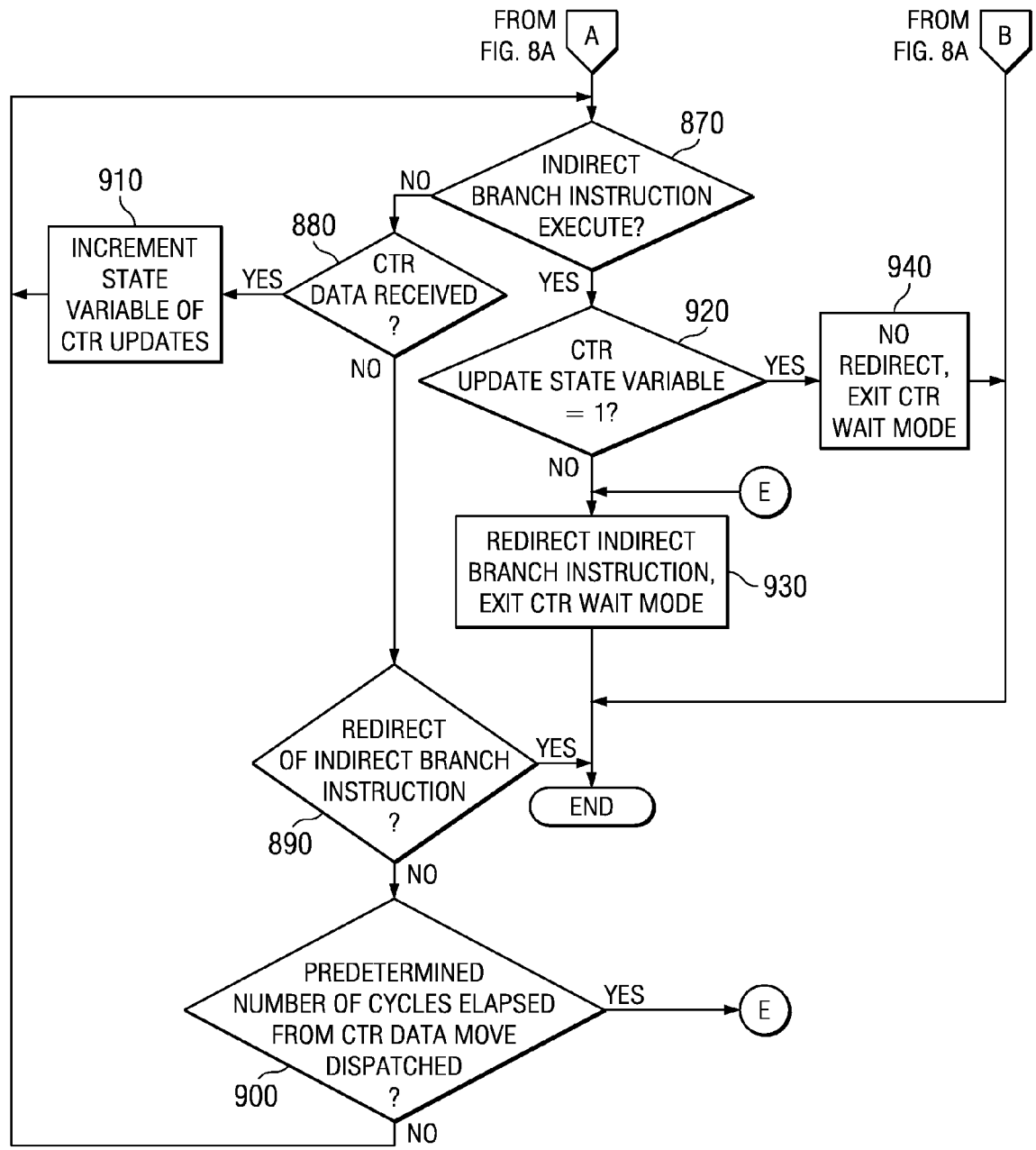

FIGS. 8A-8B illustrate a flowchart outlining an exemplary operation for handling indirect branches of execution in accordance with one illustrative embodiment. While the illustrative embodiments described above are preferably implemented in hardware, such as in functional units of a processor, various aspects of the illustrative embodiments may be implemented in software as well. For example, it will be understood that each block of the flowchart illustration in FIGS. 8A-8B, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

The flowchart shown in FIGS. 8A-8B outlines the primary operations of the mechanisms of the illustrative embodiments. For ease of representation in a flowchart form, some states, e.g., the states R0 and R1 in FIG. 7, are not represented in this flowchart. It should be appreciated that the inclusion of such states in the flowchart would require an additional loop in the flow. Thus, FIGS. 8A-8B are intended to only be exemplary of the primary operations and are not intended to state or imply any limitation with regard to the particular operations that must be or could be performed by the mechanisms of the illustrative embodiments.

As shown in FIGS. 8A-8B, the operation starts with the instruction fetch unit receiving an indirect branch instruction, e.g., a bcctr instruction (step 810). The instruction fetch unit determines if the indirect branch instruction is predictable or not (step 820). As discussed above, this determination may be made by determining if there is a count cache hit for this indirect branch instruction, for example. If the indirect branch instruction is predictable, then the predicted branch target address, such as from the count cache, may be used to continue fetching of instructions by the instruction fetch unit (step 825). Otherwise, the indirect branch instruction is determined to be hard to predict, i.e. unpredictable, and the instruction fetch unit enters a count register wait (CTR_wait) mode of operation (step 830).

In the CTR_wait mode of operation, the instruction fetch address register (IFAR) logic is configured to route incoming CTR data, such as from a move to count register (mtctr) instruction, to the instruction fetch address register (step 840). The branch execution unit is informed, by the instruction fetch unit, of the unpredictable indirect branch instruction being encountered and the instruction fetch unit being placed in the CTR_wait mode of operation (step 850). The branch execution unit is further informed of the tag for the indirect branch instruction that caused the CTR_wait mode of operation (step 860).

The branch execution unit determines if the indirect branch instruction is received for execution (step 870). As discussed above, this may be done by comparing the itag stored in the branch execution unit to the itag of a received indirect branch instruction to determine if the itags match. If they match, then it is determined that the indirect branch instruction that caused the CTR_wait mode of operation has been received for execution.

If the indirect branch instruction is not received for execution, the branch execution unit determines whether CTR data has been received, i.e. there is a CTR update (step 880). If not, the branch execution unit determines whether a redirect of the indirect branch instruction was performed (step 890). If there was a redirect of the indirect branch instruction, then the operation terminates. If there was not a redirect of the indirect branch instruction, the branch execution unit determines whether a predetermined number of cycles, e.g., 4 cycles, has elapsed from the CTR data move being dispatched (step 900). If not, the operation returns to step 870. Otherwise, if the predetermined number of cycles have elapsed, then the operation continues to step 930, discussed hereafter. If the CTR data has been received (step 880), a state variable for counting the number of CTR updates is incremented (step 910) and the operation returns to step 870.

If an indirect branch instruction is received for execution (step 870), the branch execution unit determines if the CTR update state variable is equal to 1, i.e. there has only been one CTR update between the time that the indirect branch instruction is received in the instruction fetch unit and when it is received for execution in the branch execution unit (step 920). If there was only one CTR update in this period, then no redirect of the indirect branch instruction is necessary and the CTR_wait mode of operation may be exited (step 940). In this case, the instruction fetch unit will continue fetching of instructions at the branch target address corresponding to that identified in the CTR data. The operation then terminates.

If zero, or more than one, CTR update has been performed, then the indirect branch instruction needs to be redirected (step 930). In this case, the CTR data does not store the branch target address for the indirect branch instruction that initiated the CTR_wait mode of operation and thus, cannot be used to continue instruction fetching. As a result, the instruction fetch unit is redirected and instruction fetching is continued, i.e. the CTR_wait mode is exited. The operation then terminates.

Thus, the illustrative embodiments provide a mechanism for saving processor cycles when handling hard to predict indirect branch instructions in a processor. The illustrative embodiments allow the branch target address to be inserted into the instruction fetch address register from the SPR bus as it is being moved to the count register. Moreover, the illustrative embodiments provide logic in the branch execution unit for determining if the branch target address is correct or not so as to determine whether a redirect operation is needed or not. The result of these mechanisms is that the illustrative embodiments allow the branch target address to be fetched in parallel with the dispatching of the indirect branch instruction which in turn results in a reduction in the number of processor cycles required to implement the indirect branch prediction.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in processor, comprising:
    detecting a hard to predict indirect branch instruction being provided to an instruction fetch unit of the processor;
    placing the instruction fetch unit in a wait mode of operation, in response to detecting a hard to predict indirect branch instruction being provided to the instruction fetch unit, waiting for a branch target address to be provided, via a bus, to a count register used by the indirect branch instruction;
    extracting the branch target address from the bus as the branch target address is being provided to the count register;
    placing the extracted branch target address in an instruction fetch address register;
    exiting the wait mode of operation in response to the branch target address being placed in the instruction fetch address register; and
    fetching instructions using the instruction fetch unit based on the branch target address in the instruction fetch address register.

2. The method of claim 1, further comprising:
    determining if the indirect branch instruction that caused the wait mode of operation in the instruction fetch unit is received in a branch execution unit for execution;
    determining if only one count register update has been performed between detecting the indirect branch instruction being provided to the instruction fetch unit and the indirect branch instruction being received in the branch execution unit; and
    directing instruction fetching by the instruction fetch unit based on results of determining if only one count register update has been performed.

3. The method of claim 2, wherein directing instruction fetching by the instruction fetch unit based on results of determining if only one count register update has been performed comprises:
    flushing a pipeline of the processor if zero or more than one count register update has been performed between detecting the indirect branch instruction being provided to the instruction fetch unit and the indirect branch instruction being received in the branch execution unit.

4. The method of claim 2, wherein placing the instruction fetch unit in a wait mode of operation further comprises:
    providing a notification to a branch execution unit that a hard to predict indirect branch instruction is detected in the instruction fetch unit;
    providing an instruction tag to the branch execution unit, the instruction tag corresponding to the hard to predict indirect branch instruction; and
    storing the instruction tag in a register of the branch execution unit.

5. The method of claim 4, wherein determining if the indirect branch instruction that caused the wait mode of operation in the instruction fetch unit is received in a branch execution unit for execution comprises:
    comparing an instruction tag of an indirect branch instruction received in the branch execution unit to the instruction tag stored in the register of the branch execution unit; and
    determining that the indirect branch instruction that caused the wait mode of operation in the instruction fetch unit has been received in the branch execution unit if the instruction tags match.

6. The method of claim 1, wherein detecting a hard to predict indirect branch instruction being provided to an instruction fetch unit of the processor comprises:
    checking a count cache to determine if a candidate branch target address for a received indirect branch instruction is present in the count cache; and
    determining that the received indirect branch instruction is a hard to predict indirect branch instruction if no candidate branch target address is present in the count cache for the received indirect branch instruction.

7. The method of claim 1, wherein detecting a hard to predict indirect branch instruction being provided to an instruction fetch unit of the processor comprises:
    checking a count cache to determine if a candidate branch target address for a received indirect branch instruction is present in the count cache;
    in response to a candidate branch target address being present in the count cache for the received indirect branch instruction, determining if the candidate branch target address is marked as hard to predict; and
    determining that the received indirect branch instruction is a hard to predict indirect branch instruction if a candidate branch target address is present in the count cache and the candidate branch target address is marked as hard to predict.

8. The method of claim 7, wherein the candidate branch target address is marked as hard to predict if a predetermined number of uses of the candidate branch target address result in the candidate branch target address being incorrect in branch prediction.

9. The method of claim 1, wherein the bus is a special purpose register bus, and wherein the branch target address is provided to the count register from a general purpose register via the special purpose register bus.

10. The method of claim 9, wherein the special purpose register bus comprises signal lines for providing the branch target address to both the count register and instruction fetch address register logic of the instruction fetch unit.

11. An apparatus, comprising:
    an instruction fetch unit; and
    a count register coupled to the instruction fetch unit via a bus, wherein the instruction fetch unit comprises:
    logic that detects a hard to predict indirect branch instruction being provided to the instruction fetch unit;
    logic that places the instruction fetch unit in a wait mode of operation, in response to detecting a hard to predict indirect branch instruction being provided to the instruction fetch unit, waiting for a branch target address to be provided, via the bus, to the count register;
    logic that extracts the branch target address from the bus as the branch target address is being provided to the count register;
    logic that places the extracted branch target address in an instruction fetch address register;
    logic that exits the wait mode of operation in response to the branch target address being placed in the instruction fetch address register; and logic that fetches instructions using the instruction fetch unit based on the branch target address in the instruction fetch address register.

12. The apparatus of claim 11, further comprising:
a branch execution unit coupled to the instruction fetch unit, wherein the branch execution unit comprises:
logic that determines if the indirect branch instruction that caused the wait mode of operation in the instruction fetch unit is received in a branch execution unit for execution;
logic that determines if only one count register update has been performed between detecting the indirect branch instruction being provided to the instruction fetch unit and the indirect branch instruction being received in the branch execution unit; and logic that directs instruction fetching by the instruction fetch unit based on results of determining if only one count register update has been performed.

13. The apparatus of claim 12, wherein the logic that directs instruction fetching by the instruction fetch unit based on results of determining if only one count register update has been performed comprises:
logic that causes flushing of a pipeline of a processor if zero or more than one count register update has been performed between detecting the indirect branch instruction being provided to the instruction fetch unit and the indirect branch instruction being received in the branch execution unit.

14. The apparatus of claim 12, wherein the logic that places the instruction fetch unit in a wait mode of operation further comprises:
logic that provides a notification to a branch execution unit that a hard to predict indirect branch instruction is detected in the instruction fetch unit; and
logic that provides an instruction tag to the branch execution unit, the instruction tag corresponding to the hard to predict indirect branch instruction, and wherein the branch execution unit stores the instruction tag in a register of the branch execution unit.

15. The apparatus of claim 14, wherein the logic that determines if the indirect branch instruction that caused the wait mode of operation in the instruction fetch unit is received in the branch execution unit for execution comprises:
logic that compares an instruction tag of an indirect branch instruction received in the branch execution unit to the instruction tag stored in the register of the branch execution unit; and logic that determines that the indirect branch instruction that caused the wait mode of operation in the instruction fetch unit has been received in the branch execution unit if the instruction tags match.

16. The apparatus of claim 11, wherein the logic that detects a hard to predict indirect branch instruction being provided to an instruction fetch unit of the processor comprises:
logic that checks a count cache to determine if a candidate branch target address for a received indirect branch instruction is present in the count cache; and
logic that determines that the received indirect branch instruction is a hard to predict indirect branch instruction if no candidate branch target address is present in the count cache for the received indirect branch instruction.

17. The apparatus of claim 11, wherein the logic that detects a hard to predict indirect branch instruction being provided to an instruction fetch unit of the processor comprises:
logic that checks a count cache to determine if a candidate branch target address for a received indirect branch instruction is present in the count cache;
logic that, in response to a candidate branch target address being present in the count cache for the received indirect branch instruction, determines if the candidate branch target address is marked as hard to predict; and
logic that determines that the received indirect branch instruction is a hard to predict indirect branch instruction if a candidate branch target address is present in the count cache and the candidate branch target address is marked as hard to predict.

18. The apparatus of claim 17, wherein the candidate branch target address is marked as hard to predict if a predetermined number of uses of the candidate branch target address result in the candidate branch target address being incorrect in branch prediction.

19. The apparatus of claim 11, wherein the bus is a special purpose register bus, and wherein the branch target address is provided to the count register from a general purpose register via the special purpose register bus.

20. The apparatus of claim 19, wherein the special purpose register bus comprises signal lines for providing the branch target address to both the count register and instruction fetch address register logic of the instruction fetch unit.

* * * * *